March 31, 1942.   U. B. BRAY   2,277,842
ASPHALT AND PROCESS FOR PRODUCING THE SAME
Filed March 5, 1938
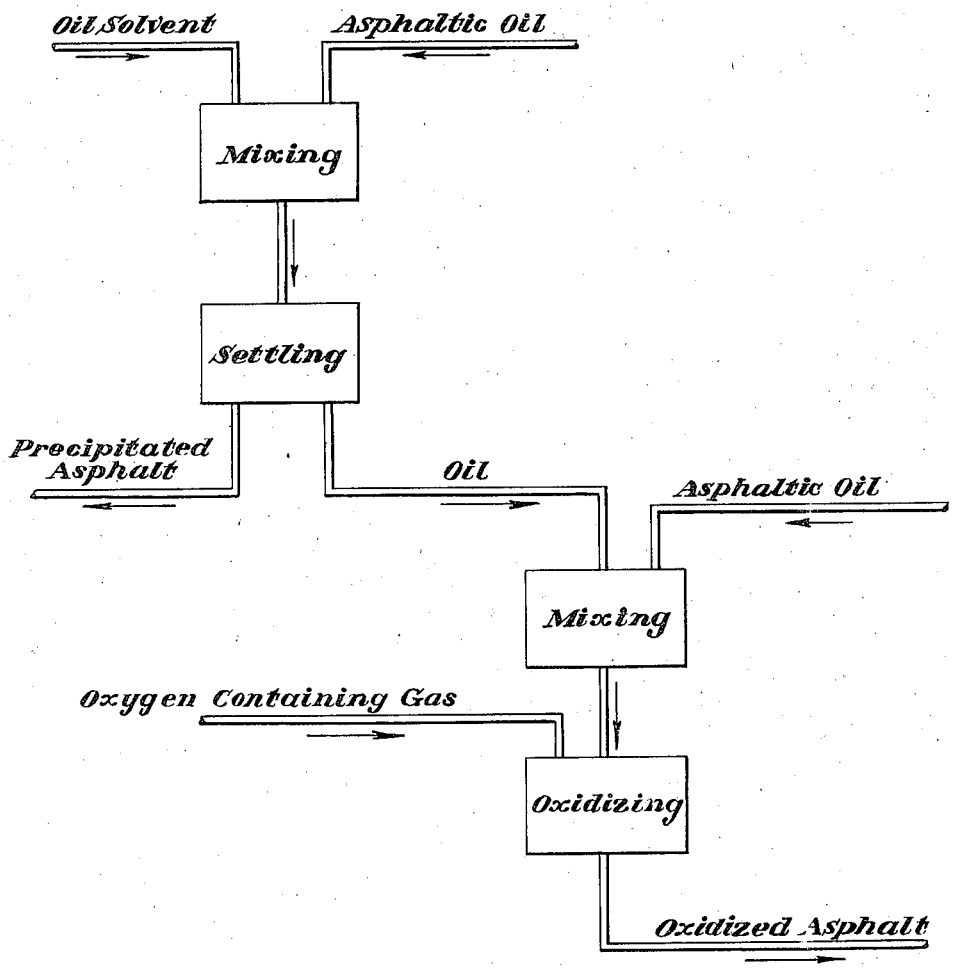

Patented Mar. 31, 1942

2,277,842

UNITED STATES PATENT OFFICE 2,277,842

ASPHALT AND PROCESS FOR PRODUCING THE SAME

Ulric B. Bray, Palos Verdes Estates, Calif., assignor to Union Oil Company of California, Los Angeles, Calif., a corporation of California Application March 5, 1938, Serial No. 194,174

15 Claims. (Cl. 196—74)

This invention relates to a process for the manufacture of asphalts, particularly air-blown or oxidized asphalts. It is an object of my invention to improve the air-blown characteristics of asphalt.

Another object of my invention is to improve the characteristics of the charging stock from which the oxidized asphalt is produced. Other objects of my invention will appear from the following description of my invention.

It is well known in the art of manufacturing air-blown asphalts that such products may be prepared by blowing the charging stock with air or other oxygen-containing gases at an elevated temperature and that the resulting oxidized asphalt will possess desirable low temperature susceptibilities, high melting points for given penetrations and moderately high ductilities. The charging stock generally employed is a topped residue obtained from an asphalt-base crude oil.

It is generally recognized in the asphalt industry that the nature of the charging stock used in the manufacture of air-blown asphalt has a very marked effect on the properties of the air-blown product. Some charging stocks produced from certain selected crude oils oxidize to better asphalts than charging stocks produced from other crude oils. One of the best naturally occurring charging stocks for air-blowing purposes is the asphalt residue produced by steam topping a crude oil obtained from the Orcutt, California oil fields.

In studying the behavior of different charging stocks and as a result of considerable experimentation on the fundamentals involved in the production of air-blown asphalt, I have found that first, the ratio of oil to bitumen in charging stocks is a very important item and second, the nature of the oil present as regards its viscosity gravity constant, sulfur content, etc. also has a very marked effect on the course of the air-blowing reactions which in turn determine the properties of the finished product. Specifically, the higher the oil content associated with a given bitumen in the charging stock, the greater will be the degree of air-blown characteristics obtained as measured by the increase in penetration over that of conventional steam-blown asphalt for a given melting point. Also, for a given oil content in the charging stock, the nature of the oil has a very marked effect with the result that in general the lower the viscosity gravity constant of the oil component, the greater will be the degree of air-blown characteristics obtained.

Specifically, I have found that the charging stocks may be greatly improved by fluxing the charging stock with a viscous, high molecular weight oil produced by extracting asphalt-containing oil or residue with a solvent in which the bitumen is insoluble but in which the oil is soluble. The process for separating oil from asphaltic oils by means of solvents is well known. This process consists in mixing the asphaltic oil with a suitable amount of a solvent which is capable of dissolving oil but which has a low solvent power for the bitumen and then separating the solution of oil and solvent from the undissolved bitumen. Solvents capable of effecting this separation are liquefied normally gaseous hydrocarbons such as ethane, propane, butane, iso-butane, and sometimes pentane, or mixtures thereof. Such hydrocarbons are obtained by rectification of casinghead gasoline by the so-called stabilizing method now conventional in the natural gasoline industry. They comprise the overhead gaseous fractions of the stabilizing process. The gaseous fractions are liquefied by compression and cooling in the conventional manner and are drawn off into pressure chambers where they are maintained in the liquid state until they are used. The necessary pressure to maintain propane, for example, in a liquid state, is approximately 125 lbs. per square inch gauge at 75° F. Also, a mixture of propane and low boiling gasoline fractions or petroleum naphtha can be made to exhibit a required solvent power intermediate between that of propane and the naphtha by controlling the proportion of propane and naphtha. Likewise, natural gasoline can be used where the bitumen component of the residuum is susceptible to precipitation by hydrocarbon solvents of higher solvent power.

When separating the asphalt by precipitation, the asphaltic oil is mixed with about five volumes of propane, for example, at a pressure of about 125 lbs. per sq. inch, or upwards and the mixture is allowed to remain in a quiescent state until the precipitated asphalt has settled to the bottom of the container. The clear supernatant solution of oil and propane is then decanted and subjected to distillation to remove the propane. The undistilled portion consists of the oil which was extracted from the asphaltic oil and which I desire to employ for fluxing with air-blowing charging stocks. It is usually desirable to pass the asphaltic residue and the extracting solvent countercurrent to each other in the extraction operation, in order to conserve solvent and to aid the recovery of oil from the asphaltic residue.

The asphaltic residue from which the extracted oil is produced may be one which of itself does not blow well into certain specialized asphaltic products. The crude oil from which the asphaltic residue is derived is preferably topped by distillation with steam or vacuum until all of the light oils have been removed and a residue remains which contains various high molecular weight oils and bitumen. As an example, Poso Creek crude oil may be steam topped at a temperature of 600° F. until a residue is produced having a viscosity of 240 seconds Saybolt Furol at 210° F. and a flash point of 425° F. This residue may then be extracted with propane to produce an oil having a viscosity of 160 seconds Saybolt Universal at 210° F.

With certain crudes, particularly those containing high percentages of sulfur, such as Santa Maria Valley in California and crude from the shores of the Great Salt Lake in Utah, the bitumen fraction is more easily precipitated by hydrocarbon solvents, and higher molecular weight solvents such as butane, pentane, and natural gasoline can be used. Of course, the higher the molecular weight of the solvent, the less will be the yield of asphalt and the higher the melting point of the asphalt precipitated. However, it is sometimes necessary to remove only the highest melting asphaltic fractions from a given stock in order to transform it into a suitable blowing stock or suitable fluxing oil for other blowing stocks.

It is generally considered that the higher the flash point of the finished asphalt, the better is its weathering quality. In conventional methods of producing asphalts of both the steam-blown and air-blown varieties, one is limited as regards flash points obtainable with a given crude stock by the composition of the crude stock in terms of the amount and nature of the bitumen and the amount and nature of the oil component. Thus, at any given penetration grade, the asphalt is in reality a mixture of high melting, high flash bitumen plasticized by oil fractions to give the desired penetration (and melting point). In conventional methods of refining, the oils, which must be left undistilled in the charging stock or finished asphalt for the sake of affording a sufficient volume to serve as the plasticizer, are often lower in boiling range than is consistent with the best weathering behavior. By my process, I overcome all of these limitations and can produce both charging stocks and finished asphalts having not only any desired ratio of oil to bitumen, but also having oils of as high boiling range as desired. The solvent extracted flux oil which I employ may have a high flash point by virtue of the stock having been distilled to a high flash point before extraction or the extracted oil may be further distilled after solvent extraction to obtain the desired boiling range.

The extracted oil thus produced may then be blended with the air-blowing charging stock in the desired proportions, depending upon the characteristics of the charging stock. It may be blended with asphaltic residue derived from the same crude oil from which the viscous oils are produced by propane extraction, or it may be blended with more valuable blowing stocks such as Orcutt residuum. The extracted oil may be blown directly if desired to produce asphalts of unusually high penetrations for a given melting point. I have found that the air-blown characteristics of even the best air-blowing stocks, such as Orcutt crude oil residuum may be improved by the addition of viscous, high molecular weight oils which are obtained by propane extraction of another portion of the same residuum or a different residuum. The extracted oils may be used in the manufacture of blended asphalts having desirable properties without air-blowing, depending on the character of the extracted oil and the bitumen components of the blend.

The proportion of extracted oil to be used for fluxing an air blowing stock will depend upon the air-blowing qualities of the air blowing stock and upon the characteristics of the extracted oil itself. In general, I may employ from 10 to 70% of the viscous oil to 90 to 30% of the straight residuum before subjecting the blend to air-blowing.

The drawing represents a flow sheet of the above described process.

The following specific examples are submitted of my invention which, however, are not to be considered as limiting but merely as illustrative of the invention.

*Example 1*

Sixty-five parts by weight of a steam-blown asphalt produced by steam distilling crude oil derived from Panuco, Mexico, and having a penetration of 178 at 77° F., a melting point of 105° F. and a flash point of 460° F. were blended with 35 parts by weight of a viscous, high molecular weight oil having an A. P. I. gravity of 16.5 and a viscosity of 328 seconds Saybolt Universal at 210° F. The lubricating oil was obtained by steam distilling an asphaltic crude oil derived from Santa Fe Springs until a residue was produced having a viscosity of 180 seconds Saybolt Furol at 210° F., and a flash point of 525° F. and then extracting the oil with liquid propane at a temperature of 120 and under a pressure of about 280 lbs. per square inch.

The resulting blend at a temperature of about 350° F. was then oxidized with air in one of the conventional ways at a temperature of about 300° to 500° F. After steam distilling the oxidized product to remove light oils, the oxidized charge had a penetration of 16 (200 g. 60 sec.) at 32° F., 24 (100 g. 5 sec.) at 77° F. and 40 (50 g. 5 sec.) at 115° F., a melting point of 221° F., a flash point of 500° F., a ductility of 2.6 cm. at 77° F. and solubilities of 99.5% in $CS_2$ and $CCl_4$ and of 64% in 86° naphtha. This sample showed a weathering life of 122 cycles in a standard weather-ometer test.

In order to show that the blended charging stock resulted in a superior product, a straight asphalt residuum produced from the above Panuco crude oil was oxidized under the same conditions. The product resulting from this oxidation had a penetration of 9 at 32° F., 13 at 77° F., and 33 at 115° F., a melting point of 220° F., a ductility of 2.5 cm. at 77° F., a flash point of 405° F., and solubilities of 99.5% in $CS_2$ and $CCl_4$ and of 58% in 86° naphtha. This sample showed a weathering life of only 51 cycles in the standard weather-ometer test.

*Example 2*

Thirty parts by weight of a butane precipitated asphalt having a melting point of 296° F. produced by distilling crude oil derived from Santa Maria, California, to remove gasoline fractions and then butane extracting the residue, were blended with 70 parts by weight of propane extracted oil similar to that used in Example 1.

The blend was then oxidized as in the above example to produce an oxidized asphalt having a melting point of 218° F., a penetration of 23 at 77° F., a flash point of 540° F., and a weather-ometer test of 131 cycles.

A comparison of this product with oxidized straight Santa Maria residuum having a melting point of 220° F., a penetration of 13 at 77° F., a flash point of 390° F., and a weather-ometer test of only 56 cycles shows the superior quality of the asphalt made by my process.

It will be observed that for determining the melting point, penetration, ductility, flash point, solubility in $CS_2$ and solubility in $CCl_4$, the following methods outlined by the American Society of Testing Materials were used:

Melting point, ball and ring method_ D-36-26
Penetration_____ D-5-25
Ductility_____ D-113-32T
Flash point, Cleveland open cup method_____D-92-24
Solubility in $CS_2$_____D-4-27
Solubility in $CCl_4$_____D-165-27

The standard weather-ometer test is the well known test which was developed by Dr. Strieter of the United States Bureau of Standards. This test has been described in an article entitled "Accelerated test of asphalts" by O. G. Strieter, Research Paper No. 197, Bureau of Standards, Journal of Research, vol. 5, page 247, 1930.

The above description of my invention is not to be considered as limiting but only as illustrative of the invention as many variations may be made within the scope of the following claims.

I claim:

1. A process for producing oxidized asphalt which comprises blending an oil which will oxidize into asphalt with an oil which has been extracted from an asphalt containing oil by means of a solvent capable of dissolving oil but not substantial quantities of asphalt and subsequently oxidizing said blend of oils at an elevated temperature with an oxygen-containing gas to produce an oxidized asphalt having a higher weather-ometer test than can be produced by oxidation of said aforementioned oil which will oxidize into asphalt in the absence of said extracted oil to substantially the same melting points.

2. A process for producing oxidized asphalt which comprises blending an oil which will oxidize into asphalt with an oil which has been extracted from an asphalt containing oil by means of a liquefied normally gaseous hydrocarbon and subsequently oxidizing said blend of oils at an elevated temperature with an oxygen-containing gas to produce an oxidized asphalt having a higher weather-ometer test that can be produced by oxidation of said aforementioned oil which will oxidize into asphalt in the absence of said extracted oil to substantially the same melting points.

3. A process for producing oxidized asphalt which comprises blending an oil which will oxidize into asphalt with an oil which has been extracted from an asphalt containing oil by means of propane and subsequently oxidizing said blend of oils at an elevated temperature with an oxygen-containing gas to produce an oxidized asphalt having a weather-ometer test of approximately 122 cycles.

4. A process for producing oxidized asphalt which comprises blending an asphalt-containing oil with an oil which has been extracted from an asphalt-containing oil by means of a solvent capable of dissolving oil but not substantial quantities of asphalt and subsequently oxidizing said blend of oil at an elevated temperature with an oxygen-containing gas to produce an oxidized asphalt having a weather-ometer test of approximately 122 cycles.

5. A process as in claim 4 in which the blend of oils before oxidation comprises approximately 10 to 70% of the asphalt-containing oil and approximately 90 to 30% of the extracted oil.

6. A process for producing oxidized asphalt which comprises commingling an asphalt-containing oil with a solvent capable of dissolving oil but not substantial quantities of asphalt, separating the major portion of the asphalt from the solution of oil and solvent, removing the solvent from the solution of oil and solvent and subsequently oxidizing said oil at an elevated temperature with an oxygen containing gas.

7. A process as in claim 6 in which the solvent is a liquefied normally gaseous hydrocarbon.

8. A process as in claim 6 in which the solvent comprises propane.

9. A process as in claim 6 in which the solvent comprises butane.

10. An oxidized asphalt produced by oxidizing a blend of asphalt containing oil and an oil extracted from an asphalt-containing oil by means of a solvent capable of dissolving oil but not substantial quantities of asphalt, said oxidized asphalt having penetrations of approximately 16 at 32° F., of 24 at 77° F. and 40 at 115° F., a melting point of approximately 221° F., a flash point of approximately 500° F., a ductility of approximately 2.6 cm. at 77° F., solubilities of approximately 99.5% in $CS_2$ and $CCl_4$ and 64% in 86° naphtha and a weather-ometer test of approximately 122 cycles.

11. An oxidized asphalt produced by oxidizing a blend of a solvent precipitated asphalt with an oil extracted from an asphalt-containing oil by means of a solvent capable of dissolving oil but not substantial quantities of asphalt, said oxidized asphalt having a melting point of approximately 218° F., a penetration of approximately 23 at 77° F., a flash point of approximately 540° F. and a weather-ometer test of 131 cycles.

12. A process for producing oxidized asphalt which comprises blending an oil which will oxidize into asphalt with a viscous, high molecular weight oil which has been extracted from an asphalt-containing oil by means of a solvent capable of dissolving oil but not substantial quantities of asphalt and subsequently oxidizing said blend of oils at an elevated temperature with an oxygen-containing gas to produce an oxidized asphalt having a weather-ometer test of approximately 122 cycles.

13. A process for producing oxidized asphalt which comprises blending an asphalt-containing oil with a viscous high molecular weight oil having an A. P. I. gravity of approximately 16.5 and a viscosity of approximately 328 seconds Saybolt Universal at 210° F., said oil being extracted from an asphalt-containing oil by means of a solvent capable of dissolving oil but not substantial quantities of asphalt and subsequently oxidizing said blend of oils at an elevated temperature with an oxygen-containing gas.

14. A process for producing oxidized asphalt which consists in the steps of mixing an asphaltic oil with a solvent capable of dissolving oil but not substantial quantities of asphalt, allowing said mixture to settle to separate precipitated asphalt for a solution of oil in said solvent, separating said solution of oil from said precipitated asphalt, blending the oil thus extracted with an oil which will oxidize into asphalt and subsequently oxidizing said blend of oils at an elevated temperature with an oxygen-containing gas.

15. An oxidized asphalt produced by oxidizing a blend of an asphalt-containing oil and an oil extracted from an asphalt-containing oil by means of a solvent capable of dissolving oil but not substantial quantities of asphalt, said oxidized asphalt having a penetration of approximately 24 at 77° F., a melting point of approximately 221° F., a flash point of approximately 500° F. and a weather-ometer test higher than one produced by oxidizing said asphalt-containing oil in the absence of said extracted oil to a melting point of approximately 220° F.

ULRIC B. BRAY.